Oct. 10, 1950 J. E. WILLARD 2,525,251
HONEY BOX FOR BEEHIVES
Filed March 10, 1947

Inventor
Joseph E. Willard

By Clarence A. O'Brien
and Harvey B. Jacobson
Attorneys

Patented Oct. 10, 1950

2,525,251

UNITED STATES PATENT OFFICE 2,525,251

HONEY BOX FOR BEEHIVES

Joseph E. Willard, Christiansburg, Va.

Application March 10, 1947, Serial No. 733,665

7 Claims. (Cl. 6—1)

This invention relates to new and useful improvements in beehives and more particularly to a honey container or honey box therefor and the primary feature of the present invention is to provide a honey box adapted for use by honey producers that is preferably formed of a transparent plastic material permitting visibility into the box at all times for observing the amount of honey being produced therein.

Another important feature of the present invention is to provide a honey box having a removable top including a threaded opening therein adapted to receive a threaded plug, said plug when removed therefrom permits means for bees entering the box and by merely inserting the plug in place to the top of the box the device is readily and conveniently packed for shipment.

A further feature of the present invention is to provide a honey box of the character referred to including new and novel means for securing the top to the side walls of the box.

A still further feature of the present invention is to provide a honey box that is light and compact for shipment, strong and durable in construction, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
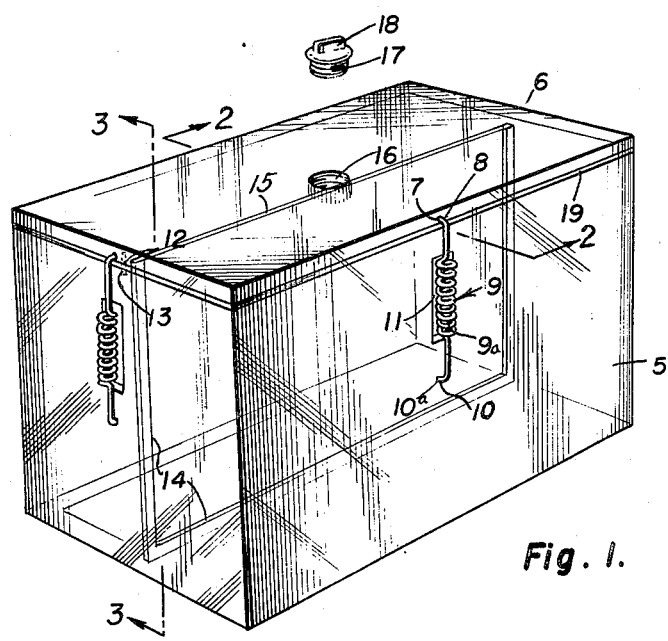
Figure 1 is a perspective view of the improved honey box constructed in accordance with the present invention, the plug insert being shown removed from the cover.
Figure 2:
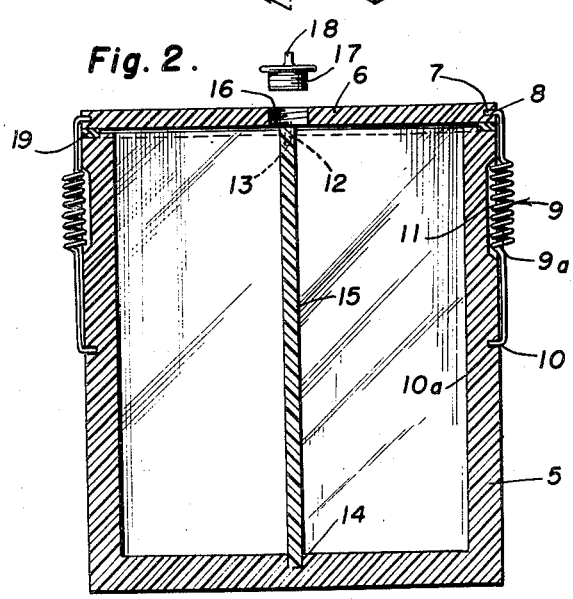
Figure 2 is an enlarged sectional view taken on line 2—2 of Figure 1.
Figure 3:
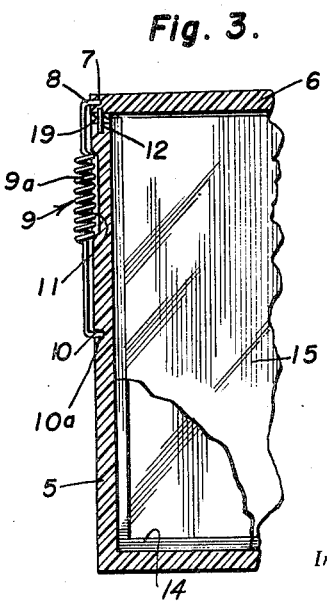
Figure 3 is an enlarged sectional view taken on line 3—3 of Figure 1.

Referring now to the drawings in detail, wherein for the purpose of illustration, I have disclosed a preferred embodiment of the present invention, the numeral 5 represents a substantially rectangular container of preferably transparent commercial form of plastic material opened at its upper end to receive a top 6.

In the side edges of the top 6 are circular recesses 7 which are adapted to receive one inturned end 8 of vertically positioned coil spring clasps designated generally as at 9 having their lower inturned ends 10 stretched downwardly to engage circular recesses 10a in the side walls of the container whereby the top is held tightly to the container as shown in Figure 1 of the drawings.

Vertical grooves 11 are provided in the side walls of the container and are adapted to receive the coiled portion 9a of the springs 9 to aid in keeping said springs in position to the side walls of the container.

To otherwise facilitate in holding the top 6 in place to the container, pegs or the like 12 having one end secured to the lower side edge of the top project downwardly therefrom to fit into vertical recesses 13 in the upper edges of the side walls of the container.

Grooves 14 are provided in the bottom of the container and in the end side walls of the container to slidably receive the edges of a starter comb 15 which is held securely in place as the top is positioned to the container.

A threaded bore 16 centrally located through the top 6 above the starter comb 15 is adapted to furnish a passage for bees entering the container with the container being preferably inverted for this purpose and also held in an elevated position by suitable supporting means.

To close the container for shipment or the like, an externally threaded plug 17 having a finger gripping rib 18 is inserted into bore 16.

It is obvious that any suitable number of starter combs may be encased in the container without changing the function of the invention.

One end of the coil springs 9 are easily removed from either the container or the top by merely pulling outwardly said end, whereby the top is removed from the container for replacing the starter combs or for removing the honey from the container.

For the purpose of tightly sealing the top to the container, a sealing gasket 19 is carried at the upper edge of the side walls of the container against which the top bears downwardly by the function of the coil springs.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A honey box of the class described, comprising a transparent container adapted to removably hold a starter comb, a top for the container having an opening, means releasably holding the top in position to the container, and a closure for said opening.

2. A honey box of the class described, comprising a transparent container adapted to removably hold a starter comb, a top for the container, spring clasp means holding the top in position to the container, said spring clasp means comprising a coil spring having one end turned in to engage a recess in the side edges of the cover, and the other end of said spring clasp means turned inwardly to engage a recess in the side wall of the container when the spring means is stretched downwardly, and a threaded plug having a finger gripping portion adapted to fit into a passage opening in the top for closing the container.

3. A honey box of the class described, comprising a transparent container adapted to removably hold a starter comb, a top for the container, spring clasp means holding the top in position to the container, said spring clasp means comprising a coil spring having one end turned in to engage a recess in the side edges of the cover, and the other end of said spring clasp means turned inwardly to engage a recess in the side wall of the container when the spring means is stretched downwardly, a threaded plug having a finger gripping portion adapted to fit into a passage opening in the top for closing the container, and said container having grooves in its side walls adapted to hold the spring means in a recessed position to the container.

4. A honey box of the class described, comprising a transparent container adapted to removably hold a starter comb, a top for the container, coil spring clasps carried by the container and connected to the top when stretched under tension to hold the top to the container, and a threaded plug having a finger gripping portion adapted to fit into a passage opening in the top for closing the container.

5. A honey box of the class described, comprising a transparent container adapted to removably hold a starter comb, a top for the container, vertically positioned coil spring clasps carried by the side walls of the container and connected to the side edges of the top when stretched under tension, said coil springs adapted to partially fit into vertical grooves in the side walls of container to hold the springs in a recessed position to the container, and a threaded plug having a finger gripping portion adapted to fit into a passage opening in the top for closing the container.

6. A honey box of the class described, comprising a transparent container adapted to removably hold a starter comb, a top for the container, spring clasp means holding the top in position to the container, dowels carried by the lower side edges of top and projecting downwardly therefrom to fit into recesses in the upper edges of the container to prevent movement of the top, and a threaded plug having a finger gripping portion adapted to fit into a passage opening in the top for closing the container.

7. A honey box of the class described, comprising a transparent container adapted to removably hold a starter comb, a top for the container, spring clasp means holding the top in position to the container, a sealing gasket between the top and the upper edges of the container, and a threaded plug removably carried in a passage opening in the top for closing the container.

JOSEPH E. WILLARD.

REFERENCES CITED

The following references are of record in the file of this patent:

UNITED STATES PATENTS

| Number | Name | Date |
|---|---|---|
| 130,932 | Mosher | Aug. 27, 1872 |
| 176,347 | Perrine | Apr. 18, 1876 |
| 747,055 | Feldmann | Dec. 15, 1903 |
| 1,073,459 | Anderson | Sept. 16, 1913 |